Patented Aug. 10, 1937

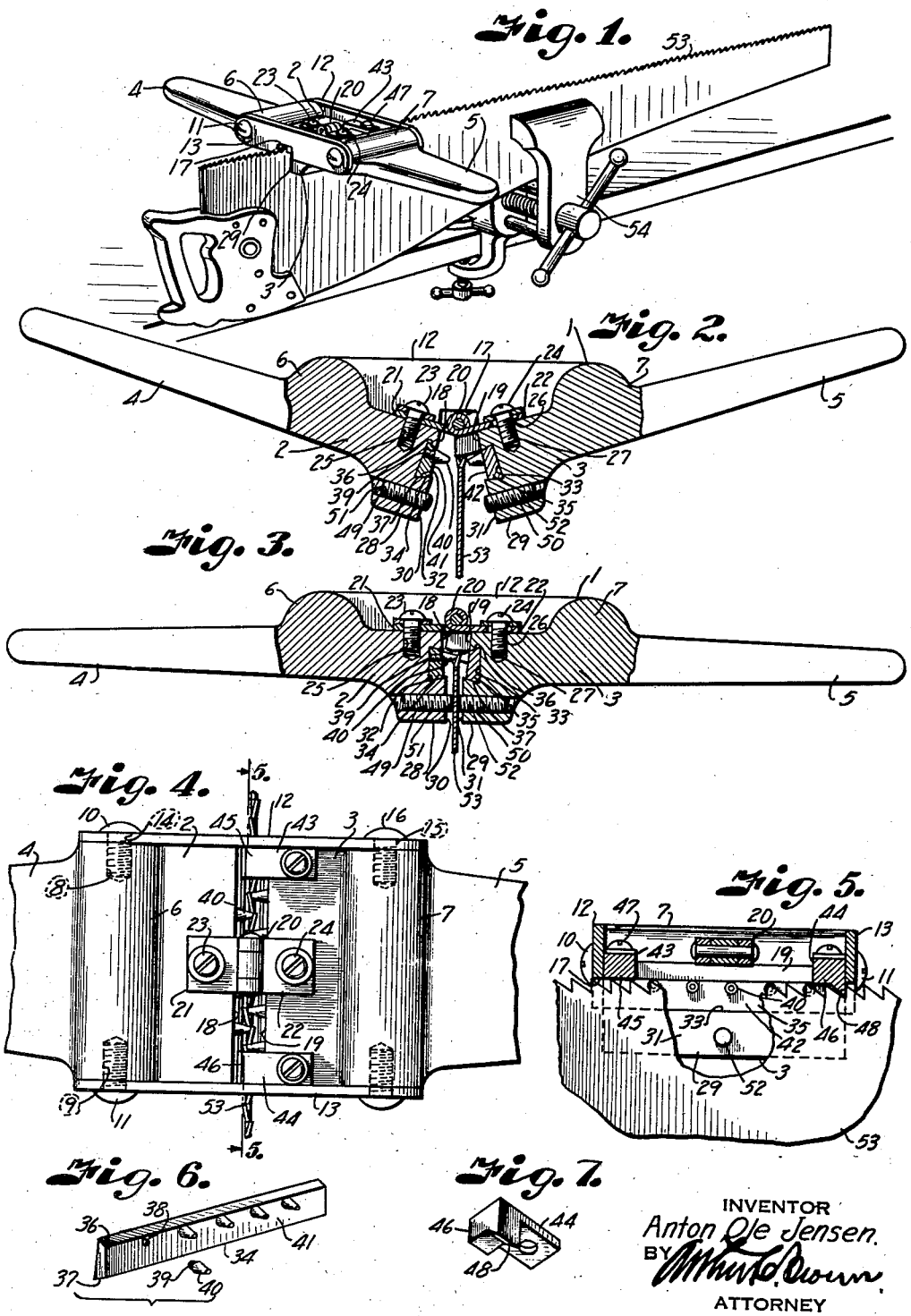

2,089,651

UNITED STATES PATENT OFFICE 2,089,651

SAW SET

Anton Ole Jensen, Kansas City, Mo.

Application November 21, 1935, Serial No. 50,853

5 Claims. (Cl. 76—61)

This invention relates to saw sets, particularly one adapted for setting a plurality of saw teeth in one operation with alternate teeth slanting in the same direction.

The principal objects of the present invention are to provide a saw set having means for imparting maximum setting pressure in a facile manner, to provide a saw set with means for regulating the angle of inclination at which the teeth of a saw are to be set, to provide for adjusting registry of the saw setting members with the teeth of a saw, to provide a saw set with removable plates equipped with differently spaced prongs for adapting the set to saws having teeth of different pitch, and to provide a saw set construction which affords visibility of the saw teeth and set prongs during setting operations.

In accomplishing these and other objects of the invention, I have provided improved details of structure, the preferred form of which is illustrated in the accompanying drawing wherein:

Fig. 1 is a perspective view of my improved saw set illustrating its application to the teeth of a saw.

Fig. 2 is a side view of the saw set illustrating the jaws thereof in open position and being applied to the teeth of a saw, the jaws being shown in section to better illustrate their construction.

Fig. 3 is a similar view illustrating the jaws in tooth setting position.

Fig. 4 is a plan view of the jaws in the position shown in Fig. 3.

Fig. 5 is a detail section through the saw set on the line 5—5 of Fig. 4.

Fig. 6 is a detail perspective view of one of the tooth setting plates with one of the prongs removed therefrom and shown in spaced relation.

Fig. 7 is a detail perspective view of a stop gauge for positioning the set in registry with the teeth of a saw.

Referring more in detail to the drawing:

1 designates a saw set constructed in accordance with the present invention and which includes a pair of jaws 2 and 3 having outwardly extending lever arms 4 and 5. Formed transversely on the upper face of each jaw, in spaced relation with the ends thereof, are substantially semi-cylindrical bosses 6 and 7 having threaded sockets 8 and 9 formed in the ends thereof, and in which are threaded trunnions 10 and 11. The trunnions 10 and 11 of the respective jaws are connected by links or carriers 12 and 13 formed of flat plate material, and having openings 14 and 15 in the ends thereof to pass the trunnions for anchoring the jaws in spaced hinged relation to each other, the links being retained by heads 16 on the respective trunnions. The lower edges of the links are provided with notches 17 which align with the space between the jaws to accommodate a saw blade therebetween, as later described.

The jaws are also connected together so that they will operate in unison, by means of a supplementary hinge 20 having leaves 21 and 22 fixed to the upper faces of the respective jaws by means of fastening devices, such as screws 23 and 24. The fastening device 23 has its shank extending through an opening in the leaf 21 and is threaded into a socket 25 in the jaw so that the leaf is retained in fixed position relative thereto. The other leaf 22, however, is provided with an elongated slot 26 through which the fastening device 24 is extended into a threaded socket 27 in the jaw 3. The slot 26 thus allows for slight movement of the hinged leaf 22 relatively to the jaw 3 to compensate for arcuate movement of the jaws when they are pivoted relatively to the connecting links 12 and 13 as clearly shown in Fig. 2.

Extending transversely across the lower face of the jaws are depending flanges 28 and 29, having faces 30 and 31 forming continuations of the jaw faces 18 and 19. Formed in the faces 18 and 19 above the flanges are dovetail grooves 32 and 33 extending transversely across the width of the jaws to removably mount the setting plates 34 and 35 which have inclined side faces 36 and 37 conforming to the inclinations of the sides of the dovetail grooves and whereby the plates are fixed against movement relatively to the direction of the lever arms 4 and 5.

Formed in the upper edges of the respective plates is a series of threaded openings 38 for mounting the threaded shanks 39 of substantially cone-shaped pegs or prongs 40 adapted to engage against the side face of the saw tooth.

The prongs on one plate are spaced to engage alternate teeth, while the prongs on the other plate are spaced to engage the intermediate teeth of a saw. In order that the prongs will engage as near the points of the teeth as possible, the jaw faces 18 and 19, and the registering face portions 41 and 42 of the plates are inclined upwardly and outwardly from the lower edges of the dovetail grooves as clearly shown in Fig. 3. This inclination sets the prongs at a slight angle and causes the points to engage directly within the points of the teeth.

To position the saw set so that the setting prongs will register with the teeth, one of the jaws, for example the jaw 3, is provided with stop members 43 and 44 that are located respectively adjacent the connecting links 12 and 13 and have projecting ends 45 and 46 overlying the space between the jaws as best shown in Fig. 4. The stops are secured to the jaw 3 by means of fastening devices, such as screws 47, extending through suitable openings therein and into threaded sockets in the jaw. In order that the prongs may be aligned with the pitch of the teeth when the set is applied to a saw, one of the stops carries a depending tooth 48 which engages in the angle formed by two adjacent teeth of the saw, as best shown in Fig. 5. When the tooth 48 is thus engaged between the teeth, as shown in Fig. 5, the setting prongs will register with the side faces of the adjacent teeth that are covered by the set.

In order to adjustably limit the angle of tooth inclination, the ribs or flanges 28 and 29 are provided with threaded openings 49 and 50 for receiving set screws 51 and 52 which may be adjusted therein to engage the opposite side faces of a saw and limit downward movement of the jaws as shown in Fig. 3, which, of course, also limits the extent to which the teeth are bent.

In operating a saw set constructed and assembled as described, the saw 53 is mounted in a suitable vise or the like 54, with the teeth projecting in an upward direction to permit ready application of the set thereto. A pair of tooth setting plates, having prongs conforming to the pitch of the teeth of the saw, are then inserted in the dovetail grooves of the jaws so that the ends thereof align with the side faces of the jaws. When in this position, the prongs on one plate will be located in staggered relation with the prongs on the other plate to conform with the spacing of the saw teeth. The lever arms 4 and 5 are then moved to spread the jaws apart, as shown in Fig. 2, and the set is placed over the saw so that the tooth edge thereof enters between the jaws to permit engagement of the stops 43 and 44 with the teeth.

When the tooth 48 on the stop 44 engages between the pair of adjacent teeth the prongs will then be in position to simultaneously engage alternate side faces of a plurality of teeth. The arms are then swung downwardly to bring the points of the prongs into engagement with the sides of the teeth. Upon further movement of the jaws one set of prongs bends alternate teeth laterally from the plane of the blade at one side and the other set bends the intermediate teeth in the opposite direction. When the set screws 51 and 52 engage the opposite side faces of the saw blade the set of the teeth is completed as shown in Figs. 3 and 4.

In order to obtain the desired set so that the cut made by the saw will be of greater width than the thickness of the blade, the stops may be adjusted by moving them into or out of their threaded sockets.

After completing the above operation, the lever arms 4 and 5 are moved apart and the device is moved to the next adjacent group of teeth after which the arms are again moved to close the jaws on the saw to effect set of that group of teeth. The device is thus moved progressively along the length of the saw until all of the teeth have been set.

From the foregoing it is obvious that I have provided a saw set which is of simple, inexpensive construction, and which is readily operated to set a plurality of teeth with one operation of the jaws. It is also obvious that the same set may be applied to saws having teeth of different pitch merely by removing one set of pronged plates and applying another set having prongs spaced in corresponding relation to the spacing of the teeth to be set.

What I claim and desire to secure by Letters Patent is:

1. In a device of the character described, a carrier having spaced fulcrum points, a pair of opposed jaws mounted on the carrier for rocking movement on the respective fulcrum points, saw tooth setting means on said jaws, and hinge means on one of the jaws and having lost motion connection with the other jaw for maintaining the jaws in cooperative alignment.

2. In a device of the character described, a carrier having spaced fulcrum points, a pair of opposed jaws mounted on the carrier for rocking movement on the respective fulcrum points whereby the jaws swing through arcuate paths intermediate the fulcrum points, saw tooth setting means on said jaws, and hinge means connecting the jaws for maintaining the saw tooth setting means on the respective jaws in cooperative alignment, said hinge means having lost motion connection with one of said jaws to compensate for arcuate movement of said jaws on said fulcrum points.

3. In a device of the character described, a carrier having spaced fulcrum points, a pair of opposed jaws mounted on the carrier for rocking movement on the respective fulcrum points, saw tooth setting means on said jaws, and hinge means connecting the jaws for maintaining the jaws in cooperative alignment, said hinge means having lost motion connection with one of said jaws to compensate for arcuate movement of said jaws on said fulcrum points, including means engageable with the cutting edge of a saw for positioning said setting means relative to the depth of the teeth of said saw.

4. A saw setting device including a carrier, a pair of opposed jaws, saw tooth setting means on the respective jaws, means pivotally mounting the respective jaws at spaced points on the carrier, means on one of the jaws engageable between teeth of a saw for positioning said jaw with the saw tooth setting means thereon in gauged relation with the saw, and means on the other jaw and engageable with the jaw having said tooth engaging means for maintaining the saw tooth setting means on said other jaw in cooperative alignment with the tooth setting means on the jaw carrying said tooth engaging means.

5. A saw setting device including a carrier, a pair of opposed jaws, saw tooth setting means on the respective jaws, means pivotally mounting the respective jaws at spaced points on the carrier, means on one of the jaws engageable between teeth of a saw for positioning said jaw with the saw tooth setting means thereon in gauged relation with the saw, and a hinge means carried by one of the jaws and having a leaf portion guidingly fixed for sliding movement on the other jaw for maintaining the jaws in cooperative alignment when the jaws are actuated to move said tooth setting means in engagement with the teeth of the saw.

ANTON OLE JENSEN.